(12) United States Patent
Daiber et al.

(10) Patent No.: US 12,494,617 B2
(45) Date of Patent: Dec. 9, 2025

(54) TUNABLE LASER WITH CHANNEL SELECTOR

(71) Applicant: Terabix, Inc., Emerald Hills, CA (US)

(72) Inventors: Andrew Daiber, Emerald Hills, CA (US); Sergei Sochava, Sunnyvale, CA (US)

(73) Assignee: Terabix, Inc., Emerald Hills, CA (US)

( * ) Notice: Subject to any disclaimer, the term of this patent is extended or adjusted under 35 U.S.C. 154(b) by 829 days.

(21) Appl. No.: 17/749,060

(22) Filed: May 19, 2022

(65) Prior Publication Data

US 2022/0376463 A1 Nov. 24, 2022

Related U.S. Application Data

(60) Provisional application No. 63/191,295, filed on May 20, 2021.

(51) Int. Cl.
*H01S 5/026* (2006.01)
*H01S 5/10* (2021.01)

(52) U.S. Cl.
CPC .......... *H01S 5/0261* (2013.01); *H01S 5/0262* (2013.01); *H01S 5/1014* (2013.01)

(58) Field of Classification Search
CPC .... H01S 5/0261; H01S 5/0262; H01S 5/1014; H01S 5/0687; H01S 5/1071; H01S 5/142; H01S 5/141; H01S 3/08054; H01S 3/083; H01S 3/1062; H01S 5/026; H01S 5/10; H01S 5/14; H01S 3/08; H01S 3/106; G02B 6/12007; G02B 6/29355; G02B 6/12; G02B 6/293; G11B 7/0909; G11B 7/1378

USPC .................. 359/589; 372/20, 34; 369/44.23
See application file for complete search history.

(56) References Cited

U.S. PATENT DOCUMENTS

| | | | |
|---|---|---|---|
| 8,102,886 B1 * | 1/2012 | Ho ..................... | H01S 5/026 372/20 |
| 9,768,907 B2 * | 9/2017 | Hironishi ............ | H04J 14/0284 |
| 11,835,836 B1 * | 12/2023 | Wu ..................... | G02F 1/21 |
| 2002/0136104 A1 * | 9/2002 | Daiber ................ | G02F 1/21 369/44.23 |
| 2014/0299743 A1 * | 10/2014 | Miller .................. | G02F 1/0136 359/629 |
| 2015/0184994 A1 * | 7/2015 | Flanders ............. | H01S 5/141 372/20 |
| 2016/0164246 A1 * | 6/2016 | Rickman ............. | G02B 6/1228 372/20 |
| 2017/0269787 A1 * | 9/2017 | Eriksson ............. | G06F 3/0412 |

(Continued)

FOREIGN PATENT DOCUMENTS

CN 106330360 B * 1/2019 ......... H04B 10/0795

OTHER PUBLICATIONS

English translation of CN106330360 (Year: 2019).*

*Primary Examiner* — Thomas K Pham
*Assistant Examiner* — Kuei-Jen L Edenfield
(74) *Attorney, Agent, or Firm* — DLA Piper LLP (US)

(57) ABSTRACT

Systems and methods here may include improved tunable lasers having a tunable filter and a tunable channel selector that can control precisely the wavelength and the bandwidth of the light emitted by the laser, while suppressing light that may otherwise be emitted by the laser outside the desired wavelength and bandwidth with unidirectional ring lasers having a resonator of which forms a ring and where light propagates only in one of the two possible directions.

5 Claims, 18 Drawing Sheets

(56) References Cited

U.S. PATENT DOCUMENTS

2018/0191128 A1\* 7/2018 Chen .................. G02B 6/12004
2021/0011221 A1\* 1/2021 Janssen .............. G02B 6/29358

\* cited by examiner

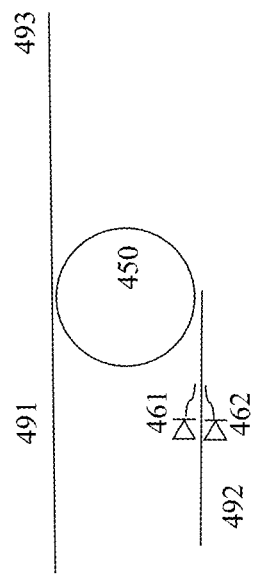

TUNABLE LASER WITH CHANNEL SELECTOR

CROSS REFERENCE TO RELATED APPLICATION

This application claims priority to U.S. Provisional Patent Application No. 63/191,295, filed on May 20, 2021, and titled "TUNABLE LASER WITH CHANNEL SELECTOR," the entirety of which is hereby incorporated by reference.

BACKGROUND

One application of lasers is for communications, where a laser produces light that is modulated and transmitted through a medium that permits propagation of the modulated light. Examples of such media that permit propagation of modulated light include fiber optic cables, air, and free space. Modulated light can be used to transmit and receive data.

A tunable laser is a laser whose wavelength of operation can be altered in a controlled manner. While light output by a laser may span a broader wavelength, concentrating light in a specific wavelength and with a controlled bandwidth permits controlled applications. Adjusting the output wavelength and bandwidth of the laser permits optimization and/or control of the light used to transmit and receive data. For example, controlling the wavelength of a laser precisely permits multiplexing of two or more lasers through the same medium (e.g., through a fiberoptic cable) to increase the volume of data transmitted or received. Also, transmitting light in a narrow bandwidth helps avoid overlapping with other optical signals transmitted or received within the same medium.

A unidirectional ring laser can include a laser with the resonator of the laser forming a ring and where light propagates only in one of the two possible directions. Unidirectional propagation can be enforced by introducing an element into the resonator which leads to different losses for the propagation directions.

Consequently, there is a significant need in the industry for improved lasers that can control precisely the wavelength and the bandwidth of the light emitted by the laser, while suppressing light that may otherwise be emitted by the laser outside the desired wavelength and bandwidth.

SUMMARY

Various example embodiments describe systems, methods and computer program products for building, integrating and using lasers for communications applications.

In an example embodiment, a tunable laser is provided. The tunable laser can include a ring-shaped laser cavity and an infinite impulse response filter disposed inside the ring-shaped laser cavity. The tunable laser can also include a tunable channel selector disposed inside the ring-shaped laser cavity. The tunable channel selector can include multiple stages. Each of the multiple stages of the tunable channel selector can be tuned to have transmission peaks at a pre-determined wavelength. At least one of the multiple stages can include a free spectral range that is at least twice a free spectral range of a previous stage included in the multiple stages. A total roundtrip transmission through the infinite impulse response filter and the tunable channel selector can be within a threshold range of an operating point.

In some instances, the total roundtrip transmission has no side modes of the operating point. In some instances, each of the multiple stages includes a tunable Mach-Zhender interferometer.

In some instances, the tunable laser can also include a free space portion and a waveguide portion. In some instances, the waveguide portion comprises the infinite impulse response filter.

In some instances, the waveguide portion comprises an output tap. In some instances, the output tap is coupled to a power monitor, a modulator, or to a receiver. In some instances, the tunable laser can also include the free space portion comprises an isolator.

In another example embodiment, a tunable filter system is provided. The tunable filter system can include an infinite impulse response filter positioned in an incident laser beam. The infinite impulse response filter can be configured to intake the incident laser beam and split the incident laser beam to a through port and a loss port. The tunable filter can also include multiple detectors positioned in the loss port. Each of the multiple detectors can be configured to intercept the split portion of the incident laser beam. Each detector can be configured to generate a detector signal. Detector signals can be generated such that a difference between the multiple detector signals generated by the multiple detectors is an error signal that indicates a degree of detuning of the incident laser beam.

In some instances, any of a wavelength of the incident laser beam or the infinite impulse response filter is tunable to minimize a difference value between the detector signals generated by the multiple detectors.

In some instances, the multiple detectors are disposed adjacent to an output waveguide in a semiconductor wafer.

In some instances, the tunable filter system can include a lens positioned to collimate a beam from the output waveguide to generate a collimated beam. The infinite impulse response filter can include a tilt and is configured to intercept the collimated beam and generate a reflected portion of the collimated beam that is incident on the multiple detectors. In some instances, the infinite impulse response filter is an etalon in a free space.

In another example embodiment, a laser is provided. The laser can include a laser cavity and a photonic tuner. The photonic tuner can include an integrated infinite impulse response filter and a tunable channel selector.

In some instances, the photonic tuner can further comprise an input waveguide and an output waveguide. The input waveguide and the output waveguide can include spot size converters for coupling light between the input waveguides and output waveguide.

In some instances, the laser can also include a tap photodiode configured to tap a portion of a light source from the input waveguide to a photodiode.

In some instances, the laser can include an unbalanced chain of tunable Mach-Zhender interferometers (MZI).

BRIEF DESCRIPTION OF THE DRAWINGS

The accompanying figures, which together with the detailed description below are incorporated in and form part of the specification, serve to further illustrate various embodiments and to explain various principles and advantages all in accordance with example embodiments of the present inventions.

FIG. 15B shows an exemplary wavelength control system for add-drop multiplexers according to various embodiments of the present disclosure.

DETAILED DESCRIPTION

Figure 1:
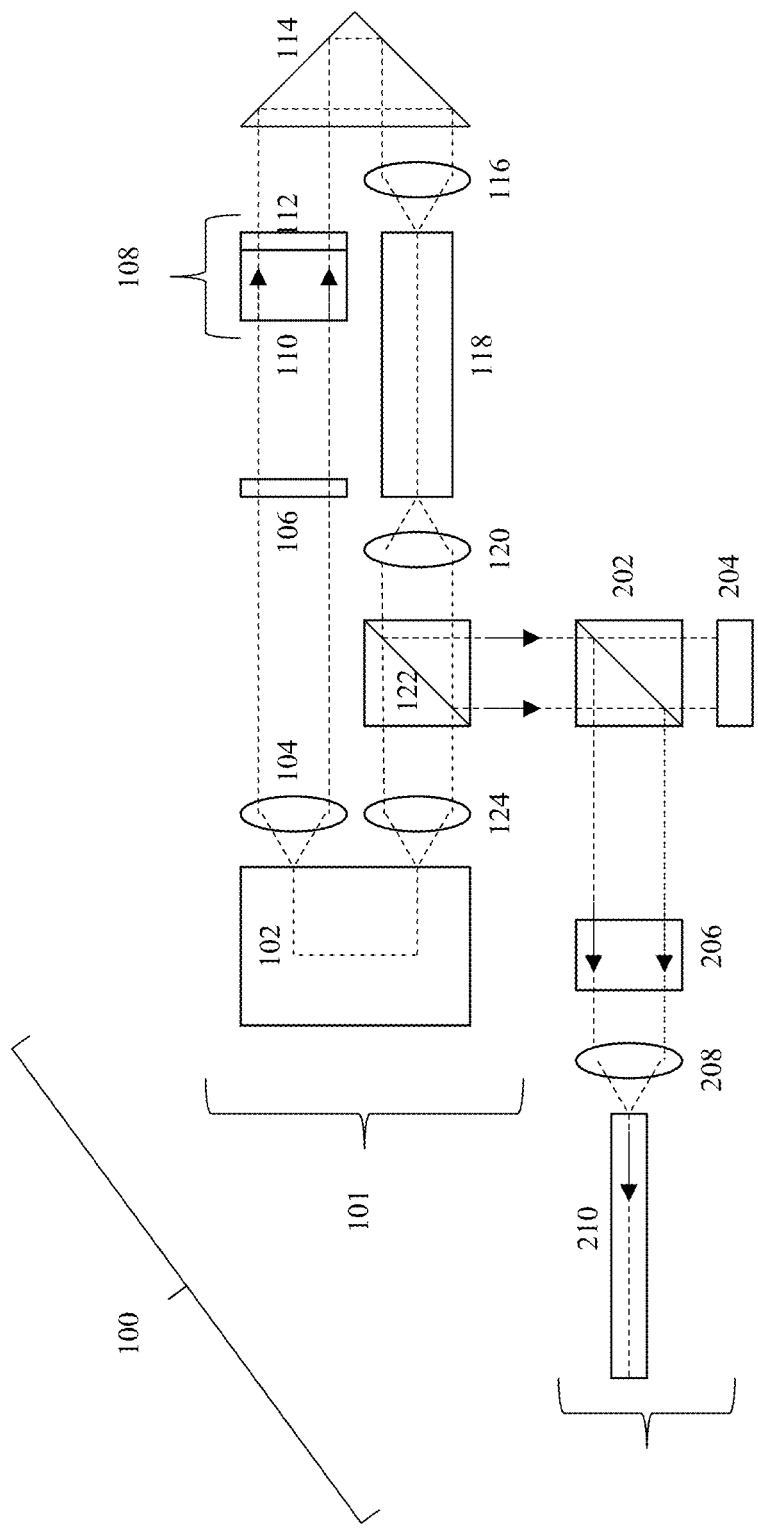
FIG. 1 shows an exemplary architecture of a tunable laser according to various embodiments of the present disclosure.

While the specification concludes with claims defining the features of the invention that are regarded as novel, the invention will be better understood from a consideration of the following description in conjunction with the drawing figures, in which like reference numerals are carried forward.

Overview

Systems and methods here may include improved tunable lasers having a tunable filter and a tunable channel selector that can control precisely the wavelength and the bandwidth of the light emitted by the laser, while suppressing light that may otherwise be emitted by the laser outside the desired wavelength and bandwidth with unidirectional ring lasers having a resonator of which forms a ring and where light propagates only in one of the two possible directions. In such an example, unidirectional propagation may be enforced by introducing an element into the resonator which leads to different losses for the propagation directions. Such systems and methods may be used in communication, where the laser light communicates data such as in fiber optic transmission. Such systems and methods may also be used in test and measurement, where the laser light receives modulation at the target such as in lidar.

Tunable Laser with Channel Selector

FIG. 1 shows an exemplary architecture of a tunable laser 100 in accordance with an example embodiment. In various embodiments, the tunable laser 100 may be a tunable unidirectional ring laser. The tunable laser 100 may include a laser cavity 101 and a partial reflector 122. The laser cavity 101 may consists of an optical path through which the laser radiation can circulate and pass through multiple elements. In various embodiments, the tunable laser cavity 101 may be laid out as a ring structure. The tunable laser 100 may include an Indium Phosphide photonic integrated circuit 118 and Silicon photonic integrated circuit 102. Integrated circuit 118 may be fabricated from other semiconductor material systems which exhibit gain at wavelengths of interest and integrated circuit 102 may be fabricated from other planar material systems such as Silicon Nitride or Indium Phosphide. The tunable laser 100 may also be an external cavity laser that includes elements that are not photonic integrated circuits. The tunable laser 100 may include two or more coupling lenses 116, 124 that couple radiation from free space into the photonic circuit waveguide. The tunable laser 100 may also include two or more collimating lenses 120, 104 that collimate radiation leaving the photonic circuit waveguide into free space. In other embodiments, the gain element 118 may be butt coupled or evanescently coupled to the Silicon photonic circuit 102. The tunable laser may also include a turning prism 114 that is used to close the circulation path within the laser cavity 101.

The example arrangement may allow laser radiation to pass through the laser cavity 101 to a partial reflector 122 that may couple energy out of the laser cavity 101 into external optics 201. For example, the partial reflector 122 may couple the energy exiting the ring structure of the tunable laser cavity 101 into external optics 201. The external optics 201 may include monitor photodiode 204 and partial reflecting tap 202 that monitor the power exiting the cavity. The external optics 201 may also include an isolator 206, a fiber coupling lens 208 and a fiber 210.

The laser cavity 101 may include one or more elements or other components used to select the laser oscillation mode. For example, the laser cavity 101 may include one or more filter elements such as Fabry-Perot filter 106 and/or channel selector 102 which together may select a longitudinal mode of lowest loss. The laser cavity may also include an isolator 108 that may select a directional mode of lowest loss and one or more polarization dependent loss elements such the Silicon photonic integrated circuit 102 (e.g., a planar Silicon photonic integrated circuit) and the Indium phosphide circuit 118 (e.g., a planar Indium phosphide integrated circuit). The polarization dependent loss elements may select a polarization mode of lowest loss. The polarization of the circulating mode may also be determined by one or more linear polarizers or other elements that may add polarization dependent loss to the ring to provide the circulating polarization mode. The recirculating laser oscillation in laser cavity 101 may occur in the collective polarization dependent loss, the directional mode of lowest loss, and the longitudinal mode of lowest loss.

The tunable laser 100 may also include a laser amplifier 118. For example, the laser amplifier 118 may be a laser diode with anti-reflection coating on the input and output facets. Alternatively, or additionally, the anti-reflection property of the laser amplifier 118 may be created by structuring a laser diode waveguide to impinge on the input and output facets at an angle other than normal. Alternative techniques for anti-reflection may be suited for unidirectional laser cavities because unidirectional laser cavities tolerate higher reflections than bidirectional cavities.

In some examples, the laser amplifier 118 may compensate for the optical loss of the laser cavity 101 by amplifying the recirculating optical power. The laser amplifier 118 may be a gain chip that includes one or more electrically pumped direct band gap semiconductors such as indium phosphide (InP), gallium arsenide, indium gallium arsenide, or gallium nitride. The different material choices provide gain over different wavelength ranges and the composition of the laser amplifier 118 may be selected based on the desired tuning range. Optically pumped direct band gap semiconductors and various crystals and glasses may also be used in the laser amplifier 118. The materials selected for the laser amplifier 118 may be chosen based on desired tuning wavelength, output power, and/or other considerations. The laser amplifier 118 may not include indirect bandgap semiconductors, most notably Silicon, but hybrid integrations of indirect band gap semiconductors with Silicon can overcome this limitation and be useful materials to include in the laser amplifier 118. Complex photonic integrated circuits can be fabricated in either direct or indirect bandgap materials allowing for the inclusion of a channel selector and other circuit integration.

In various embodiments the isolator 108 included in the tunable laser 100 may be an intracavity isolator that generates transmission dependence within the ring that depends on the direction that light travels around the ring. The intracavity isolator may generate a high transmission in a first direction by maintaining the mode in that direction such that the overlap between the transmitted field amplitude and the circulating field is nearly complete (i.e., near unity). The intracavity isolator may also generate a low transmission in the counter direction by disrupting the counter traveling mode such that the overlap of the counter-transmitted field with the counter-propagating mode is less than unity. The isolation (i.e., the difference of transmitted powers in the two direction) for laser mode selection may be about 3 dB. In some examples, the isolation for laser mode selection may be between 2 dB and 10 dB.

The intracavity isolator may include a 45° Faraday rotator 110 and half-waveplate 112. In the example, direction of propagation, the birefringent axis of the half-waveplate may be oriented to rotate the polarization −45° such that the 45° Faraday rotation provided by the 45° Faraday rotator 110 is substantially canceled thereby creating a nominally unity field overlap. In the reverse direction, the 45° rotations may accumulate to produce 90° polarization rotation which is orthogonal thereby creating a nominally zero field overlap relative to the circulating polarization.

In unidirectional laser cavities the mode may be directional and two reflections can be required to scatter back into the unidirectional mode. In bidirectional laser cavities the mode is bidirectional and a single reflection scatters back into the bidirectional mode. The additional reflections enable unidirectional laser cavities to tolerate higher reflections. This tolerance may reduce the anti-reflection requirement on the facets of laser amplifier 118 and reduce the incidence of failure from facet coating defects. This tolerance similarly may reduce the anti-reflection requirements on facets of the Silicon photonic integrated circuit 102 relative to the anti-reflection tolerance of a facet used in a bidirectional cavity. This tolerance may be used to operate the Fabry-Perot filter 106 near normal incidence or at normal incidence such that the light that is not transmitted reflects into the counter direction. Spectrally narrow Fabry-Perot filters lose transmission with increased tilt angle. Exceptionally narrow Fabry-Perot filters (i.e., etalons and or filters that cannot be tilted by about 4 times the beam divergence without incurring unacceptable insertion loss) do not reflect into the propagating mode of a unidirectional laser but may reflect into the propagating mode of a bidirectional laser. Reflections into a laser mode may create noise that may destabilize laser operating dynamics.

A further advantage of unidirectional operation is that there is no standing-wave interference pattern in the laser gain medium and consequently no spatial hole burning. Spatial hole burning may broaden the laser linewidth and may cause laser mode instability when the power circulating in the bi-directional laser rises above a stability threshold.

Tunable Fabry-Perot Filter

The tunable elements may include a tunable filter and a channel selector. For example, the tunable filter may include a tunable Fabry-Perot filter 106. The Fabry-Perot (FP) filter 106 is a linear optical resonator which consists of two highly reflecting mirrors. The FP filter 106 transmits light at resonance, which may be very sharp, and reflects light away from resonance. The very sharp resonance allows a longitudinal mode within the laser cavity 101 to be selected while the immediately adjacent modes are sufficiently attenuated to suppress laser action on these modes. Strong resonators raise the optical field power within the resonator relative to the optical field power outside the resonator.

In various embodiments, the tunable FP filter 106 may tune the laser by transmitting the longitudinal mode within the laser cavity 101 at the wavelength of tuning and attenuating other longitudinal modes, except those at other etalon resonances. In some embodiments, the tunable FP filter 106 is tunable over the spacing between resonances (i.e., over the etalon free spectral range) allowing a resonance to be placed at any longitudinal mode wavelength.

The tunable FP filter 106 may be a temperature-stabilized etalon thermally tunable over its free spectral range. In a widely tunable laser (e.g., a laser whose tuning range is larger than the etalon free spectral range) the etalon has a plurality of transmission maxima in the tuning range. Tunability over a full free spectral range may be sufficient to precisely place one of the transmission peaks at any given wavelength of interest. To select a longitudinal mode of lowest loss and discriminate adjacent longitudinal modes, the tunable FP filter 106 may have a half width half maximum (HWHM) that is comparable to the longitudinal mode spacing. To provide a HWHM that is comparable to the longitudinal mode spacing the tunable FP filter 106 may be configured to trap and hold light in the cavity of the tunable FP filter 106 (e.g., a Silicon etalon that is 100 microns thick) for a time period that is equivalent to the amount of time it takes light to traverse the remaining structure of the laser cavity 101 (e.g., a ring shaped cavity that is 10,000 microns in optical path length). Trapping and retaining light in the tunable FP filter 106 for this period of time may amplify the optical power in tunable FP filter 106 up to or around 50 times the power outside the filter 106. Narrow linewidth semiconductor lasers (i.e., those with linewidths of 50 kHz or less) operating near 1550 nm wavelength may have cavities with total equivalent roundtrip path lengths of about 10,000 microns or more as a means to reduce the linewidth to the required value.

The increase in optical power in the tunable FP filter 106 may prevent photonic integration of the tunable FP filter 106 due to non-linear optical effects. Integrated photonic waveguides have cross-sectional dimensions on the order of the wavelength of light (e.g., about 0.4 micron for Silicon photonic circuits and about 2 microns for InP photonic circuits). In contrast, the cross section of the free space collimated beam may be 140 microns, about 4900 times larger in area and lower in irradiance (i.e., optical power density) than the same power in a Silicon waveguide and about 110,000 times larger in area and lower in irradiance than the same optical power in an InP waveguide. The tunable FP filter 106 may be a resonant cavity with an infinite impulse response. An impulse entering the resonant cavity of the tunable FP filter 106 sends out an exponentially decaying set of impulses in response, one impulse coupled out on each roundtrip of the FP resonant cavity.

In some embodiments, the Fabry-Perot transmission peaks outside the tuning range are suppressed using a non-tunable thin film filter (not shown). In other embodiments, the transmission peaks are suppressed using the limited gain bandwidth of the gain chip. The gain bandwidth is the wavelength range over which the gain chip supplies enough optical gain to overcome the optical loss on a round trip of the ring laser 101.

Tunable Channel Selector

Still referring to FIG. 1, in some example embodiments, the tunable laser 100 may also include a channel selector that transmits one etalon resonance and attenuates other etalon resonances present within the free spectral range of the channel selector. In various embodiments, the channel selector may be a tunable channel selector 102 that increases the tuning range from the spacing between etalon resonances to the tuning range of the channel selector. The tunable channel selector 102 may be tunable over the channel selector's free spectral range.

In various embodiments, the channel selector may be a tunable channel selector 102 that selects the transmission peak from a tunable filter (e.g., the tunable FP filter 106) at a wavelength of interest from among the plurality of peaks across the wavelength tuning range. To select the transmission peak of lowest loss from the tunable FP filter 106 and discriminate the adjacent transmission peaks, the HWHM of the tunable channel selector 102 may be comparable to the free spectral range (i.e., the spacing between transmission peaks) of the FP filter 106.

Figure 2:
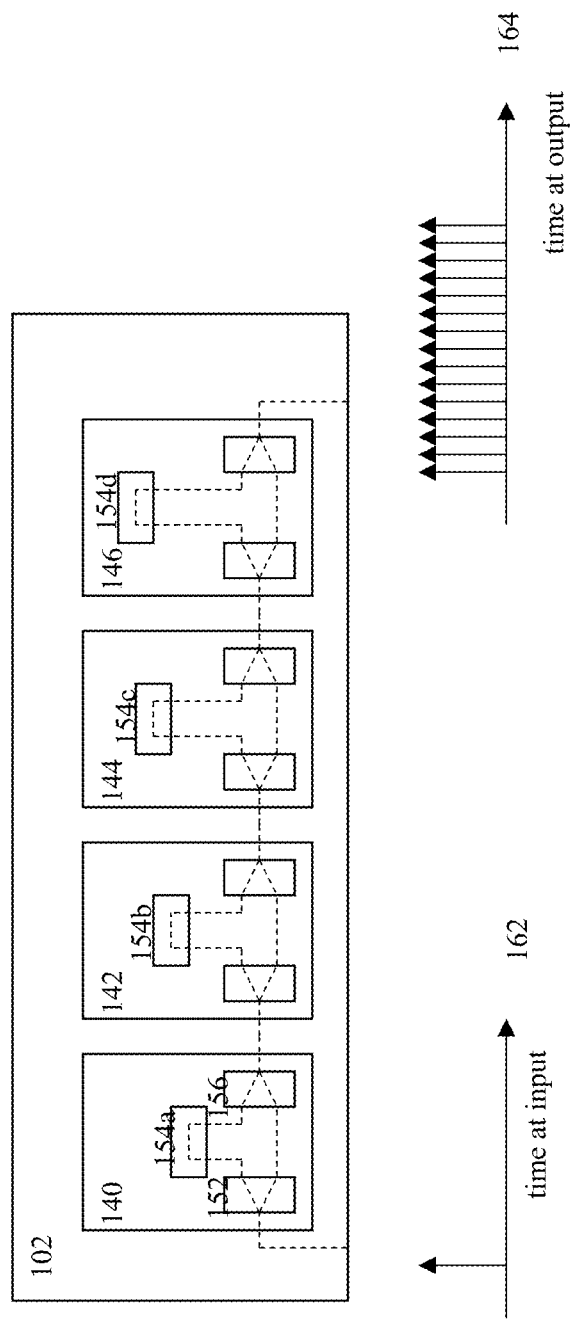
FIG. 2 shows an exemplary architecture of a channel selector according to various embodiments of the present disclosure.
Figure 3:
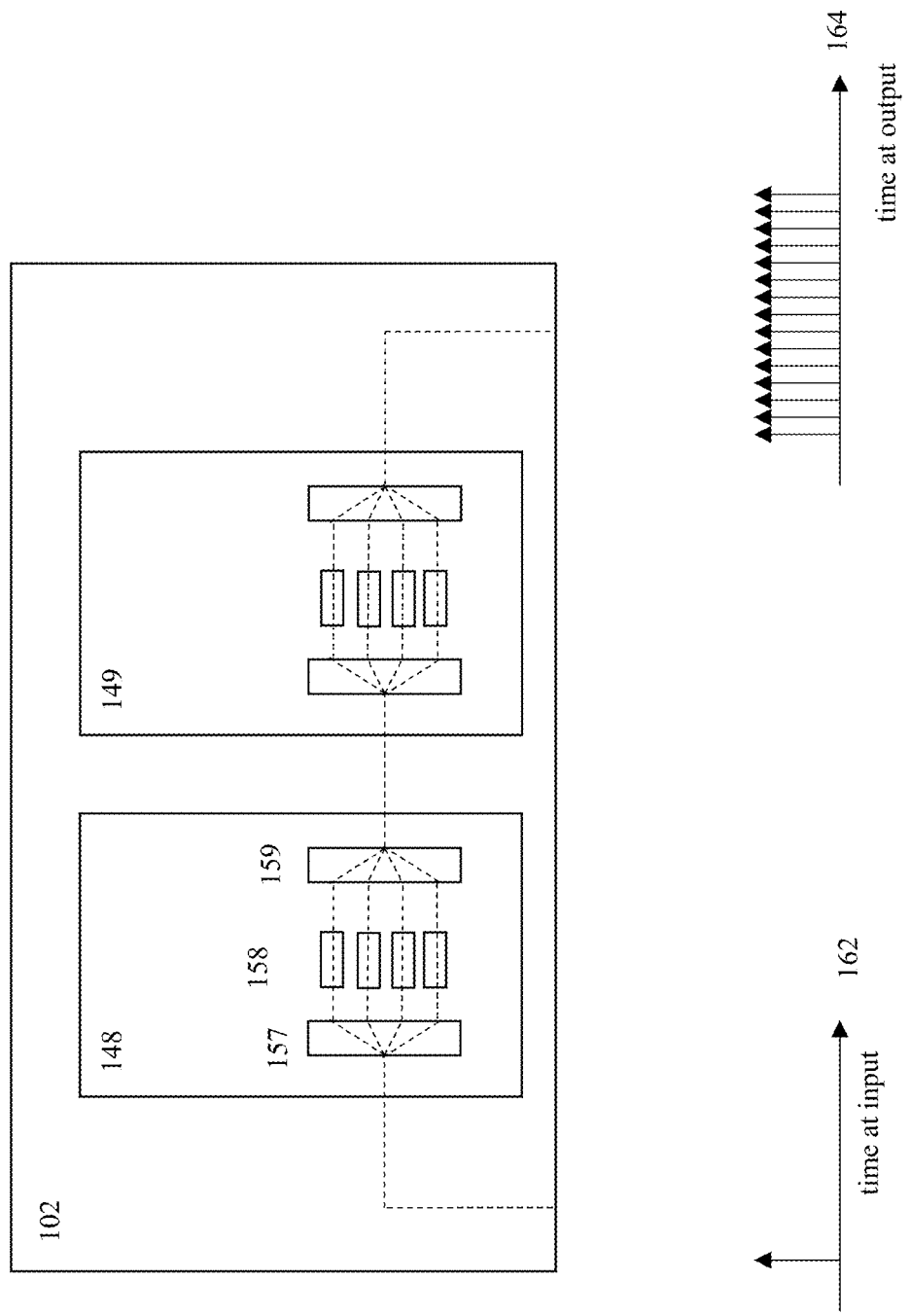
FIG. 3 shows additional details of the channel selector according to various embodiments of the present disclosure.
Figure 4:
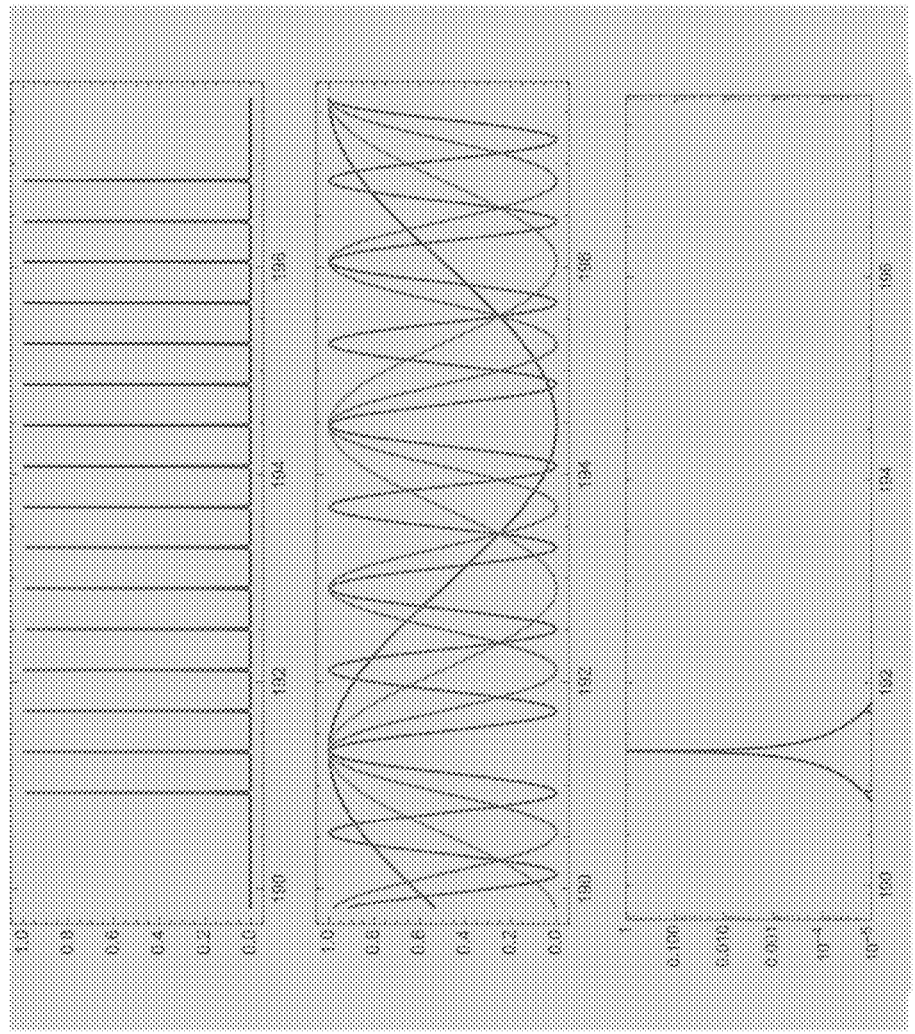
FIG. 4 displays graphs illustrating transmissions of radiation from the tunable elements at various frequencies according to various embodiments of the present disclosure.
Figure 5:
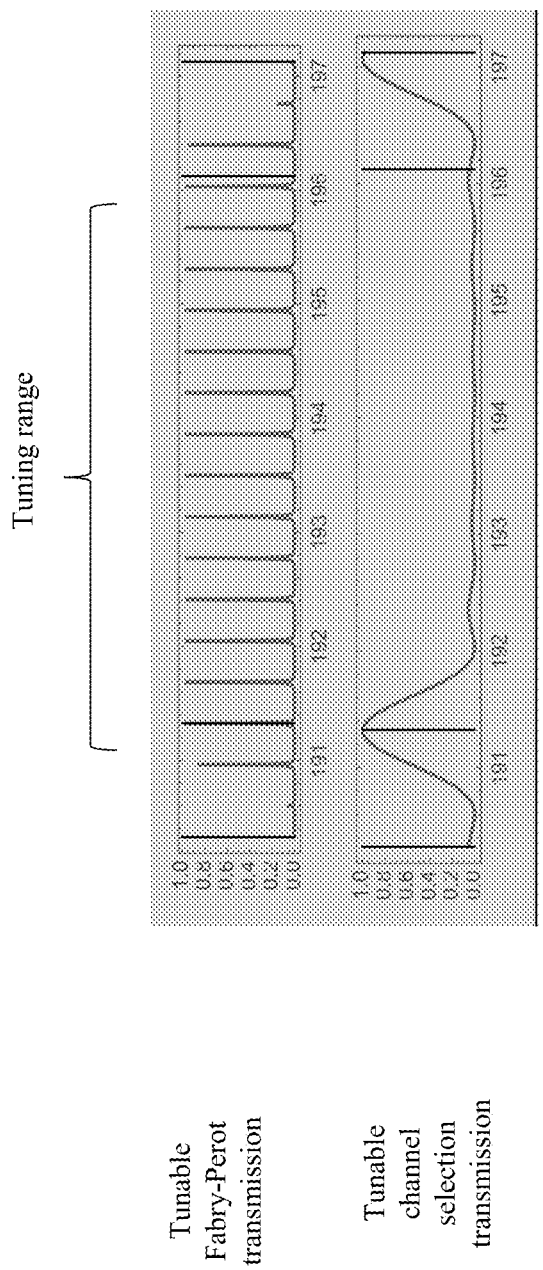
FIG. 5 displays graphs illustrating transmissions of radiation from the tunable elements over a tuning range according to various embodiments of the present disclosure.
Figure 6:
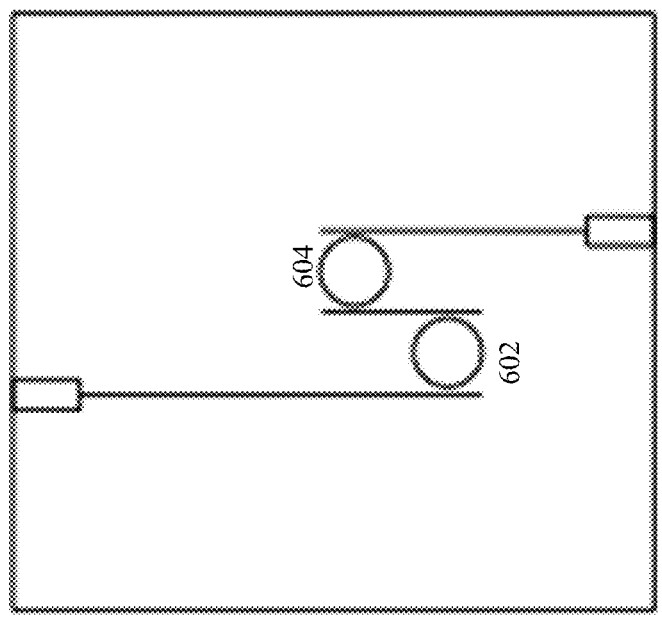
FIG. 6 shows an exemplary tunable channel selector that includes ring resonators according to various embodiments of the present disclosure.

FIGS. 2-6 illustrate exemplary embodiments of the tunable channel selector 102 that may provide a tunable Fabry-Perot transmission. FIG. 2 illustrates a tunable channel selector 102 including a photonic integrated circuit. As shown in FIG. 2, the tunable channel selector 102 may include a photonic integrated circuit that transforms a single impulse 162 at the input into a plurality of impulses 164 at the output. FIG. 3 illustrates an example embodiment of a photonic integrated circuit that transforms an impulse 162 at the input into a plurality of impulses at the output 164. In these examples, filters that produce a finite impulse train are called finite impulse response filters (note that the tunable FP filter 106 is an infinite impulse response filter). FIGS. 4-5 illustrate the exemplary outputs of the tunable channel selector 102 that may be generated by the tunable laser 100. For example, FIGS. 4-5 illustrate one or more transmissions of radiation from the tunable filter 106 and the tunable channel selector 102 at various frequencies over a tuning range. FIG. 6 illustrates an embodiment of the tunable channel selector 102 that includes a photonic integrated circuit with ring resonators.

As shown in FIG. 2, the plurality of impulses may be produced using one or more tunable Mach-Zhender interferometers (MZI). For example, the tunable channel selector 102 may include four MZI 140, 142, 144, and 146. The MZI filters 140, 142, 144, and 146 may have sinusoidal transmission patterns alternating between peak transmission and peak attenuation. MZI filters may be composed of a splitter used to split light into two or more waveguides and a combiner used to recombine the light into a single waveguide. The waveguide lengths may be dissimilar so that an impulse of light entering splitter may spend dissimilar amounts of time traveling through the waveguides and exit combiner as an impulse train in time. The MZI 140, 142, 144, and 146 may be photonic integrated and may use a multi-mode interference coupler (MMI) 152 to split the radiation of an input waveguide into two waveguides and recombine the radiation back into an output waveguide.

One or more of the MZI 140, 142, 144, and 146 may be an unbalanced MZI that has arms with different lengths. Unbalanced MZI's are filters with sinusoidal transmission patterns. The length of the sinusoidal period in Hertz is related to the length of imbalance as measured in seconds. The unbalanced MZI may split an impulse into a pair of impulses that may be separated in time by a time period equal to the length difference between the arms scaled by the speed of light. Light that passes through the unbalanced MZI may split between the two unbalanced arms and the transmission spectrum varies sinusoidally between peak transmission and peak attenuation. In various embodiments, the spectrum for this impulse train is the Fourier transform.

One or more of the MZI 140, 142, 144, and 146 may be a tunable MZI that enables the relative phase of the impulse at the output 156 to be tuned over 2-Pi using tuning element 154. The tuning element 154 (154a, b, c, d) included in each tunable MZI examples may include one or more phase shifters, for example, thermal phase shifters (TPS) that use temperature and thermo-optic effects for tuning and electro-optic phase shifters that use PN diodes and injection current for tuning. A tunable MZI may allow the peak transmission of that MZI's filter function to be tuned to a chosen wavelength by differentiating the tuning element 154a,b,c,d. Tuning all the MZI 140, 142, 144, and 146 and the tunable Fabry-Perot filter 106 to a chosen wavelength, selects the longitudinal mode closest to that wavelength as the longitudinal mode of lowest loss. Phase shifters may be placed in all waveguides, or all but one waveguide, to tune the transmission peak wavelengths. A phase shifter may not be required on one waveguide since only the separation of the impulses relative to each other determines the spectrum. In one embodiment, the phase shifters are tunable over one wavelength of pathlength to sweep the transmission peak over the full free spectral range of the filter.

FIG. 3 illustrates an alternative embodiment of the tunable channel selector 102 with different arrangement of component parts than shown in the examples of FIG. 2. In the examples of FIG. 3, stage 148 includes one by four splitters 157 and four by one combiners 159 used to build up an impulse train with four impulses. Thermal phase shifters 158 provide tenability. At a second stage 149, one by four splitters split the 4 impulses leaving the first stage 148 into four impulses each. Four by one combiners in the second stage 149 build an impulse train having 16 impulses at output. Compared to the embodiment in FIG. 2, this embodiment may produce the same impulse train and the same transmission function through the filter. However, the filter in FIG. 3 has higher parallelism which reduces the total pathlength between input and output. Shorter filter pathlength reduces total cavity pathlength and thereby increases the mode spacing between longitudinal modes. The longitudinal mode spacing affects the laser linewidth (e.g., the HWHM requirement on the tunable Fabry-Perot filter 106) and the location of photon-photon resonances in the cavity. One by M splitters typically have more spectral dependency in the split ratio (a non-ideal behavior) as M increases.

In various embodiments of the tunable MZI, the power split ratio in splitter may be adjusted so that the split light reaches the combiner with equal power and the combiner recombines the power equally to produce peak attenuation close to zero. The path length difference of the waveguides may be chosen so that the separation between peak transmission and peak attenuation is equal to N times the free spectral range of the etalon so that adjustment of the phase shifters for maximum transmission of a particular etalon resonance minimizes the transmission of the adjacent resonances when N=1, or minimizes the transmission of the Nth resonances away from the Nth resonance in general.

FIG. 4 shows the net roundtrip transmission of the laser cavity 101 with the channel selector 102 configuration shown in FIG. 2. The Fabry-Perot filter 106 (an infinite impulse response filter) is tuned to have a transmission peak at a chosen wavelength. All four stages of MZI 140, 142, 144, and 146 have been tuned to have a transmission peak at same chosen wavelength. The free spectral range of each MZI stage is chosen to be twice the FP free spectral range (FSR) or twice the FSR of the previous stage. All Fabry-Perot etalon transmission maxima that are not at the chosen wavelength have zero transmission through some stage of the MZI. The total roundtrip transmission through the tunable FP filter 106 and the tunable channel selector 102 has no side modes at the operating point. These zero transmission points are also zero in the first derivative so that the transmission remains zero with small deviations in tuning. Having no sidemodes at either the operating point or in the neighborhood (e.g., within a threshold range) of the operating point, makes the net filter provided by the tunable FP filter 106 and the tunable channel selector 102 very stable and give the net filter a consistent spectral shape with respect to small tuning deviations caused by factory calibration noise or operational tuning noise. Variations in filter spectral shape can produce variation in laser characteristics, for example stable operation at one operating point but unstable operation at another. Therefore, the highly consistent spectral characteristics provided by the tunable FP filter 106 and the tunable channel selector 102 reduce test time, improve manufacturing yield, and improve field reliability.

FIG. 5 shows the transmission through a tunable channel selector based on a three stage MZI cascade. The three MZI stages in the example are tuned to have maximum transmission at wavelength that is also the transmission maximum of the tunable Fabry-Perot filter 106. The tunable channel selector 102 has less than 50% transmission at all other Fabry-Perot transmission maxima. Reducing the number of MZI stages may reduce the pathlength of the net filter, the heating requirements for tuning, and overall complexity. However, reducing the number of MZI stages may also increase the transmission at side modes which increases the optical resonant energy (i.e., noise) present in the side mode.

As shown in FIG. 6, the tunable channel selector may also include a photonic integrated circuit with ring resonators 602, 604. The tunable channel selector may use two rings 602, 604 in a Vernier configuration. In the Vernier configuration, the ring diameters are similar but differ by some fraction amount (e.g., 1/N). This difference increases the free spectral range of the ring pair to N times the (similar) free spectral range of each individual ring. Rings resonators have smaller footprint than MZIs. Ring resonators may exhibit thermal instability not found in MZIs. Ring resonators may also store maximum at energy at maximum transmission. Instability may occur in this configuration when absorption of the stored energy quickly heats the ring and tunes to a non-transmission stage where no energy is stored and the ring quickly cools, creating a cycle. In the present embodiments, the external tunable FP filter dominates the narrowness of the roundtrip spectral filter and hence dominates where the energy is stored. In contrast to the external tunable FP filter, the rings 602, 604 in FIG. 6 may have about 50 times the spectral width. Spectrally-wide filters have less power storage and increased irradiance. Spectrally-wide filters that are thermally-tunable can have less transmission change with temperature than spectrally-narrow filters.

Integrated Tunable Filter

Figure 7A:
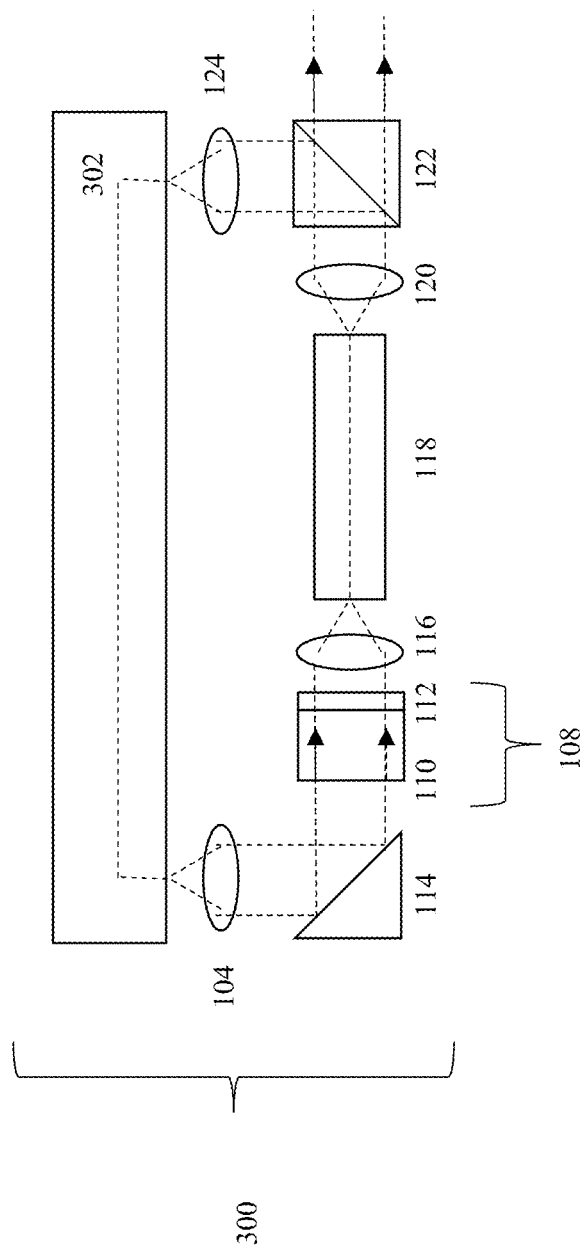
FIG. 7A shows an exemplary tunable laser according to various embodiments of the present disclosure.

FIG. 7A illustrates an exemplary laser 300 in accordance with an example embodiment. Laser 300 includes Silicon photonic tuner 302 with both an infinite impulse response filter and channel selector integrated. Compared to an example laser embodiment 100 as shown in FIG. 1, a Fabry-Perot etalon (e.g., 106) may be removed in the laser 300 as shown in FIG. 7A. The elements 104, 108, 110, 112, 114, 116, 118, 120, 122 and 124 may have similar function in laser embodiment 300 as compared to laser 100 as described in FIG. 1.

Figure 7B:
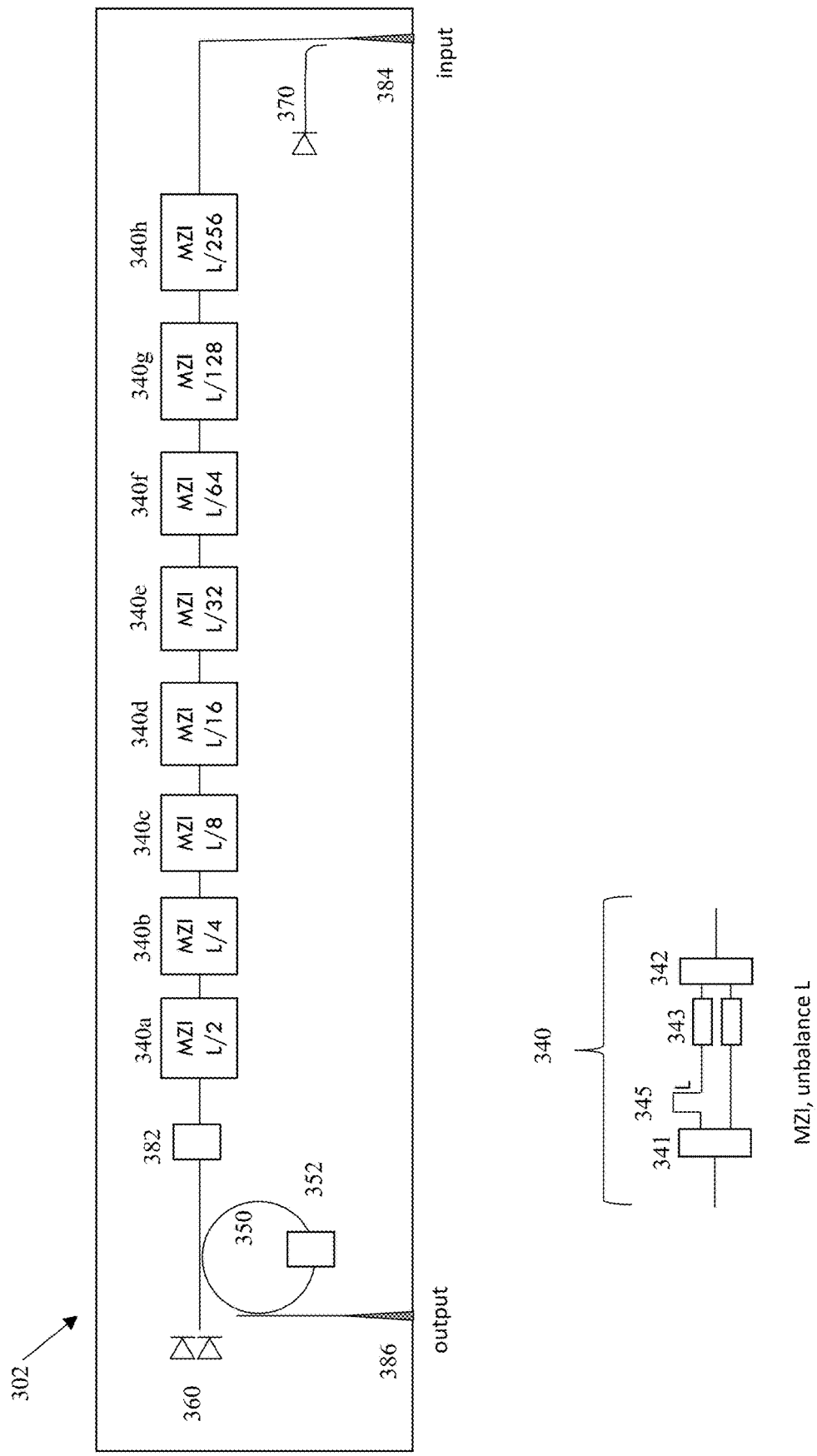
FIG. 7B shows an integrated tuner according to various embodiments of the present disclosure.

FIG. 7B illustrates an exemplary integrated tuner 302. The tuner 302 may include an input waveguide 384 and an output waveguide 386. The input waveguide 384 and output waveguide 386 may include spot size converters to efficiently couple light into and out of the Silicon waveguides. Other embodiments may use grating couplers placed on the face of component 302 instead of edge coupling placed on the facets. The integrated tuner 302 may include a tap photodiode 370 that may tap a percentage (e.g., 2%) of the light from input waveguide and deliver to a monitor photodiode. The photocurrent from tap photodiode 370 may be compared to a calibrated value for the output power of interest. The bias current to gain element 118 in laser 300 may be adjusted to achieve calibrated photocurrent target. The integrated tuner 302 may include unbalanced MZI chain (e.g., 340a, 340b, 340c, 340d, 340e, 340f, 340g, 340h). Each MZI instance 340a-h may include splitters 342, push-pull phase shifters 343, length imbalance 345, and a combiner 341. The integrated tuner 302 may include phase shifter 382 to control the phase of the light circulating through a round trip of unidirectional ring laser 300. The integrated tuner may include ring 350 to provide an infinite impulse response filter with periodic transmission resonances. The ring 350 may include phase element 352 to tune one of the transmission resonances to a wavelength of interest. The ring may include photodiode pair 360 to monitor light not coupled into ring 350 to measure detuning of lasing wavelength from resonant wavelength of ring 350. Phase adjustment 382 may be used to adjust detuning and match lasing wavelength with resonance of ring 350. In various embodiments, the phase adjustment elements may be thermo-optic, forward biased PN junctions, or reverse biased PN junctions.

In some instances, the MZI train may include elements with smaller imbalance than shown to increase tuning range. For example, reducing the MZI imbalance by a factor of two can increase the wavelength period of the sinusoidal transmission by a factor of two. This lower imbalance element may be added to the chain to double the tuning range.

Further, the MZI train may also include elements with larger imbalance than shown to suppress additional resonances of the infinite impulse response filter. Increasing the circumference of ring 350 (or thickness of Fabry-Perot element 106) by a factor of two can decrease the free spectral range (that is, the spacing between resonance) by a factor of two, which can double the number of resonances within the tuning range. Adding an element to the MZI chain with a factor of two larger imbalance can filter out all the additional resonances.

Decreasing the free spectral range (FSR) of the ring can have several advantages. For a given full width half max (FWHM) of the ring, decreasing the FSR by a factor of two can decrease the finesse (ratio of FSR to FWHM) of the ring by a factor of two and can increase the circumference a factor of two. Each factor of two decrease in finesse can reduce the power density in the ring by a factor of two. At high power density, ring loss can increase due to non-linear absorption when electrons liberated by the absorption of a photon absorb an additional photon, creating an absorption cascade that effectively limits the power density in the ring to some threshold above which the ring cannot function appropriately. Decreasing the power density by decreasing the ring FSR can enable higher power lasers.

Another advantage of decreasing the ring FSR can be that the light circulates fewer times within the ring before escaping to the output. On each circulation around the ring, fixed losses accumulate. Fixed losses can include losses which do not scale with the circumference of the ring, but rather accumulate once per round trip about the ring. Fixed losses can include scatter losses associated with ring coupling and insertion loss of the phase shifter 352.

In some instances, decreasing ring FSR can result in the side modes of the net transmission filter falling in the spectral hole caused by gain saturation in the gain chip 118. Only electrons with energy above the photon energy (equal to Planck's constant times the optical frequency) may contribute to optical gain. Gain saturation can occur when extremely high photon densities eliminate electrons with energy above the optical frequency while leaving those below the optical frequency unperturbed.

Figure 7C:
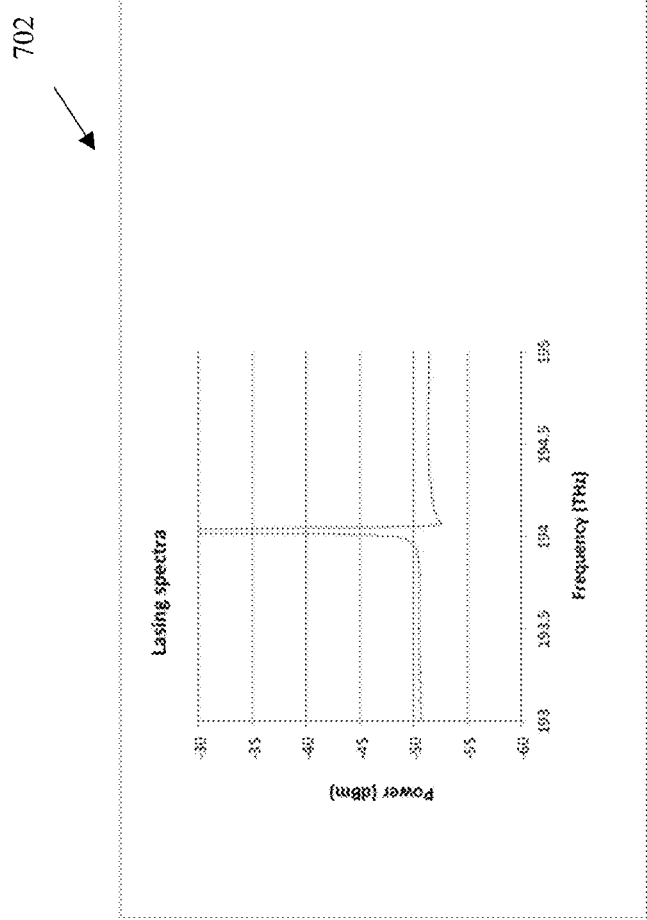
FIG. 7C shows an exemplary laser spectrum.

FIG. 7C illustrates a graphical illustration 702 of a spectrum of a typical laser lasing at 194 THz. The loss of gain above 194 THz can be visible as a drop in the amplified spontaneous emission baseline power at frequencies above 194 THz relative to frequencies below 194 THz. The loss can be greatest nearest 194 THz, dropping notably within 200 GHz of the lasing frequency. This spectral hole acts as an active filter (filter that changes dynamically based on lasing wavelength and power) that composes with the passive filters present. The passive filters can include all the linear filters such as ring 350 and MZI chain 340 used for tuning. Filter sidemodes within 200 GHz can require additional sidemode suppression. For example, filter sidemode suppression specification may be 10 dB minimum for sidemodes within 200 GHz of lasing frequency, compared to 6 dB for sidemodes further than 200 GHz from lasing frequency. Suppressing sidemodes with MZIs can mitigate such issues. In many cases, Silicon MZI suppression can be 30 dB with perfect null alignment and maintain suppression above 10 dB with 11 degrees of phase error. MZI channel selectors can improve tuning performance in lasers that include infinite impulse response filters with FSRs below 200 GHz.

Tunable Laser with Integrated Output Tap

Figure 8:
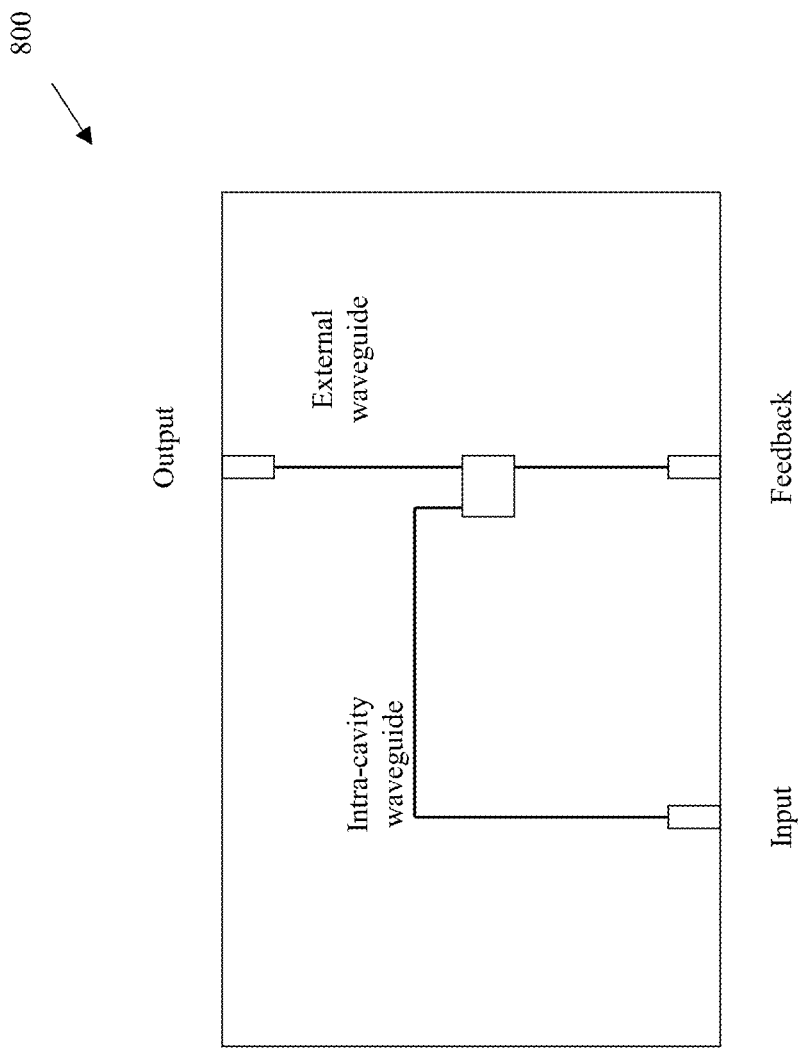
FIG. 8 shows an exemplary tunable laser having an integrated output tap according to various embodiments of the present disclosure.

FIG. 8 illustrates an exemplary tunable laser having an integrated output tap. In applications where external photonic circuits (e.g., receivers, transmitters, and/or power monitors) are integrated in the same photonic integrated circuit (PIC) as the laser, it is convenient to tap light out of an integrated laser waveguide. FIG. 8 illustrates an output tap that is connected to the integrated laser waveguide. The intracavity waveguide in FIG. 8 comprises a portion of a tunable laser, for example the tunable laser 100 shown in FIG. 1. The external waveguide may comprise a photonic circuit that is not part of the laser. The photonic circuit that may include modulator and or a coherent receiver. Fabricating modulators and receivers in the same chip as a laser reduces the chip count, reduces manufacturing costs, and enables higher levels of integration.

Systems Including Tunable Lasers

Figure 9:
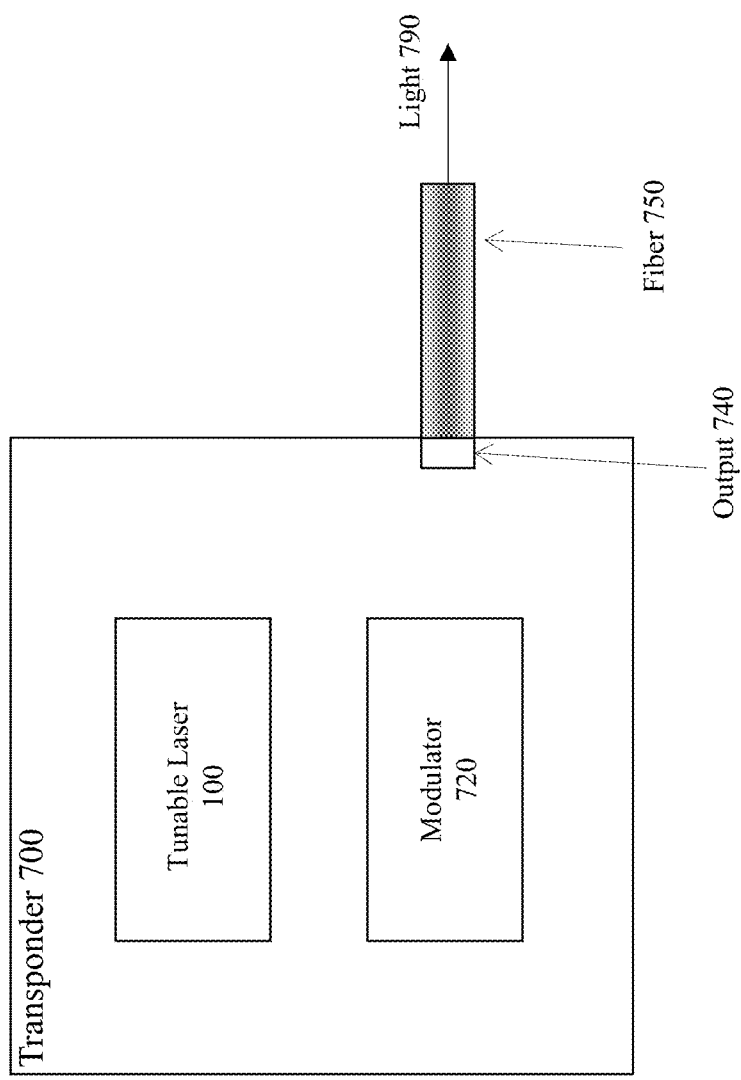
FIG. 9 shows an exemplary optical system that includes the tunable laser according to various embodiments of the present disclosure.
Figure 10:
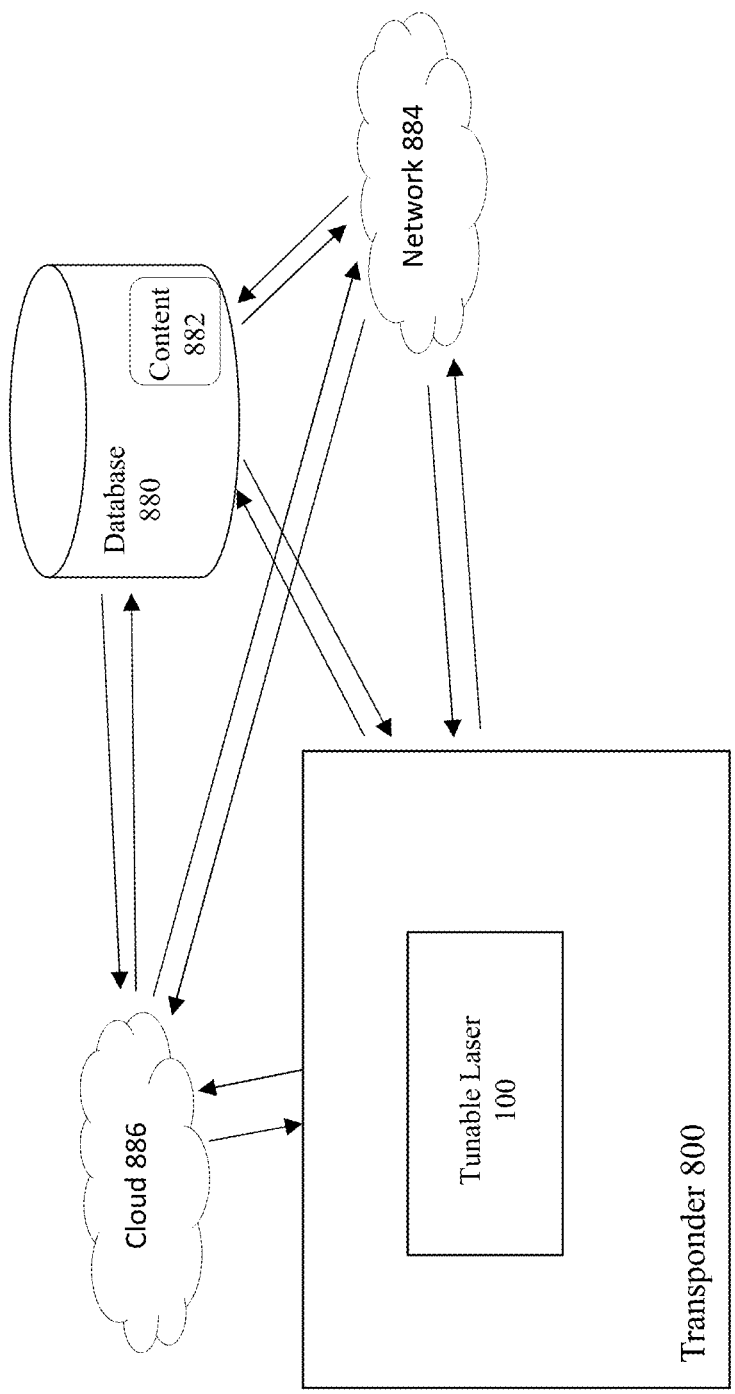
FIG. 10 shows an exemplary computing environment that includes the tunable laser according to various embodiments of the present disclosure.

In some examples as shown in FIGS. 9-10, the tunable laser 100 may be integrated into one or more systems to provide desirable functionality. For example, the tunable laser 100 may be included in one or more transponders 700, 800 that receive a signal and emit a signal from the tunable laser 100 in response. FIGS. 9-10 illustrate exemplary systems that include the tunable laser 100. FIG. 9 illustrates an exemplary optical system that includes the tunable laser 100. The optical system may include a modulated transponder 700 that includes the tunable laser 100 and a modulator 720 used to modify other emissions from the tunable laser to generate an output 740. The output 740 from the tunable laser 100 may be fed into a fiber 750 or other optical medium that carries light 790 and other emissions from the tunable laser 100.

FIG. 10 illustrates an exemplary computing environment that includes the tunable laser 100. The computing environment may include a transponder 800 that receives one or more emissions from the tunable laser 100 (e.g., signal from a LIDAR or other senor system that includes one or more lasers) and generates signal in response. The transponder 800 may communicate with one or more cloud systems 886 (e.g., cloud computing systems, cloud databases, network applications, and the like), computer networks 884, and or one or more databases 880 to transmit the signal generated based on the tunable laser 100 emissions. In various embodiments, the signal provided by the transponder 800 may be stored as content 882 (e.g., as files written in one or more human and/or machine-readable structured data formats) in the one or more databases 880.

Wavelength Control Techniques

To optimally transmit a laser beam through a narrow spectral filter (e.g., a Fabry-Perot filter), the wavelength of the laser beam may be brought into coincidence with the wavelength of the peak transmission. A control signal that measures the detuning separation (i.e., difference between the wavelength of the laser beam and the wavelength of the peak transmission) allows for feedback control to tune the wavelength and/or filter to achieve coincidence. Previous attempts to correct for detuning separation include control techniques that make small adjustments to the laser to tune the wavelength and/or the filter. After tuning, the detuning separation is measured to look for signs of positive improvement or negative improvement. Adjustments that minimize the detuning separation are then kept permanently to help achieve coincidence. Some systems have automated this process by making small +/−adjustments continuously at some frequency (i.e., a dither frequency) and demodulating the received signal at the dither frequency to derive the sign of detuning.

However, this process is not suited for communication systems and other applications that can require a high volume of signal and or a wide range of wavelengths. The dithering process (i.e., continuously making mall adjustments at some frequency) creates phase noise and relative intensity noise which may limit channel capacity. Accordingly, it is desirable to have a wavelength control method that can correct the detuning separation without requiring dithering or other disturbances to the detuning to measure the magnitude and direction of the detuning error.

Figure 11:
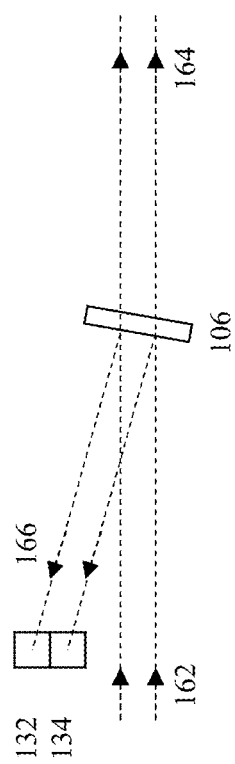
FIG. 11 shows an exemplary wavelength control system including a filter and two detectors according to various embodiments of the present disclosure.

FIG. 11 shows a wavelength control system including a filter and two detectors that may be used to implement a dither free method of measuring the detuning error. To measure the detuning error, a laser beam 162 may be directed through an etalon (e.g., the tunable FP filter 106). The laser beam 162 may be transmitted along a transmission beam axis 164 that shows the direction of an incident beam directed through the filter 106. The laser beam 162 may be reflected along a reflecting beam axis 166 that shows the direction of a reflected beam. The filter 106 may be configured to have a small tilt that spatially separates the reflected beam from the incident beam at some distance. A pair of photodetectors, 132, 134, may be placed symmetrically about the reflected beam centerline to measure the power above centerline and the power below centerline. The difference between the photocurrents generated in the detectors provides the sign of the detuning error. The photocurrents measured by the photodetectors 132, 134 may also be used to validate any adjustments made to correct the detuning error because the photodetectors 132, 134 measure equal photocurrents (i.e., a zero difference between the photocurrents) when the detuning error is zero.

In various embodiments, the filter 106 may not be tilted, and the incident beam may strike the filter 106 at normal so that the reflected beam is coincident with the incident beam. A circulator (i.e., an optical element that separates beams based on direction without nominal loss) or a partial reflector may be used to separate the reflected beam for monitoring. In this arrangement, the modes are circular Laguerre modes and may be measured by placing the first photodetector 132 that measures intensity at the beam center inside the null of the second order mode and placing the second photodetector 134 that measures intensity along an outside ring outside the null of the second order mode.

Figure 12:
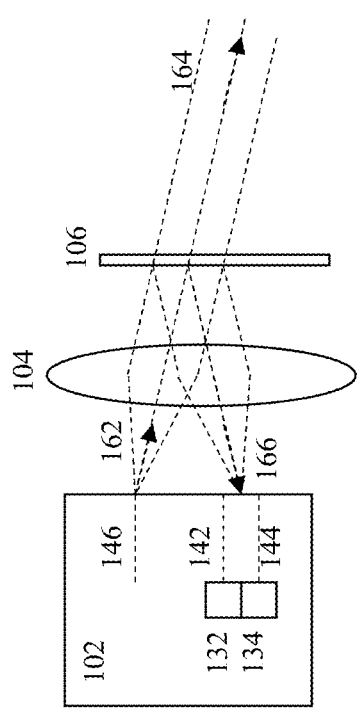
FIG. 12 shows an exemplary wavelength control system including one or more waveguides and two detectors according to various embodiments of the present disclosure.

FIG. 12 shows another example arrangement of the wavelength control system that may be used to implement a dither free method of measuring detuning error. This arrangement includes a laser beam that may be generated by an output waveguide 146 that outputs light. The laser beam 162 may be transmitted along a transmission beam axis 164 that shows the direction of an incident beam directed through the filter 106. The laser beam 162 may be reflected along a reflecting beam axis 166 that shows the direction of a reflected beam. The incident beam output by the output waveguide 146 may be collimated by a lens 104. The reflected beam may come to a focus near the output waveguide 146. A pair of waveguides 142 and 144 placed above and below the reflected beam centerline collects the reflected light and carries the reflected light to a pair of photodetectors 132, 134. The difference between the photocurrents generated in the photodetectors 132, 134 provides the sign of the detuning error. The photocurrents measured by the photodetectors 132, 134 may also be used to validate any adjustments made to correct the detuning error because the photodetectors 132, 134 measure equal photocurrents (i.e., a zero difference between the photocurrents) when the detuning error is zero. In various embodiments, the laser cavity may include fewer and or no waveguides. The waveguides may also be short. In other embodiments, the waveguides are short or absent.

Figure 13:
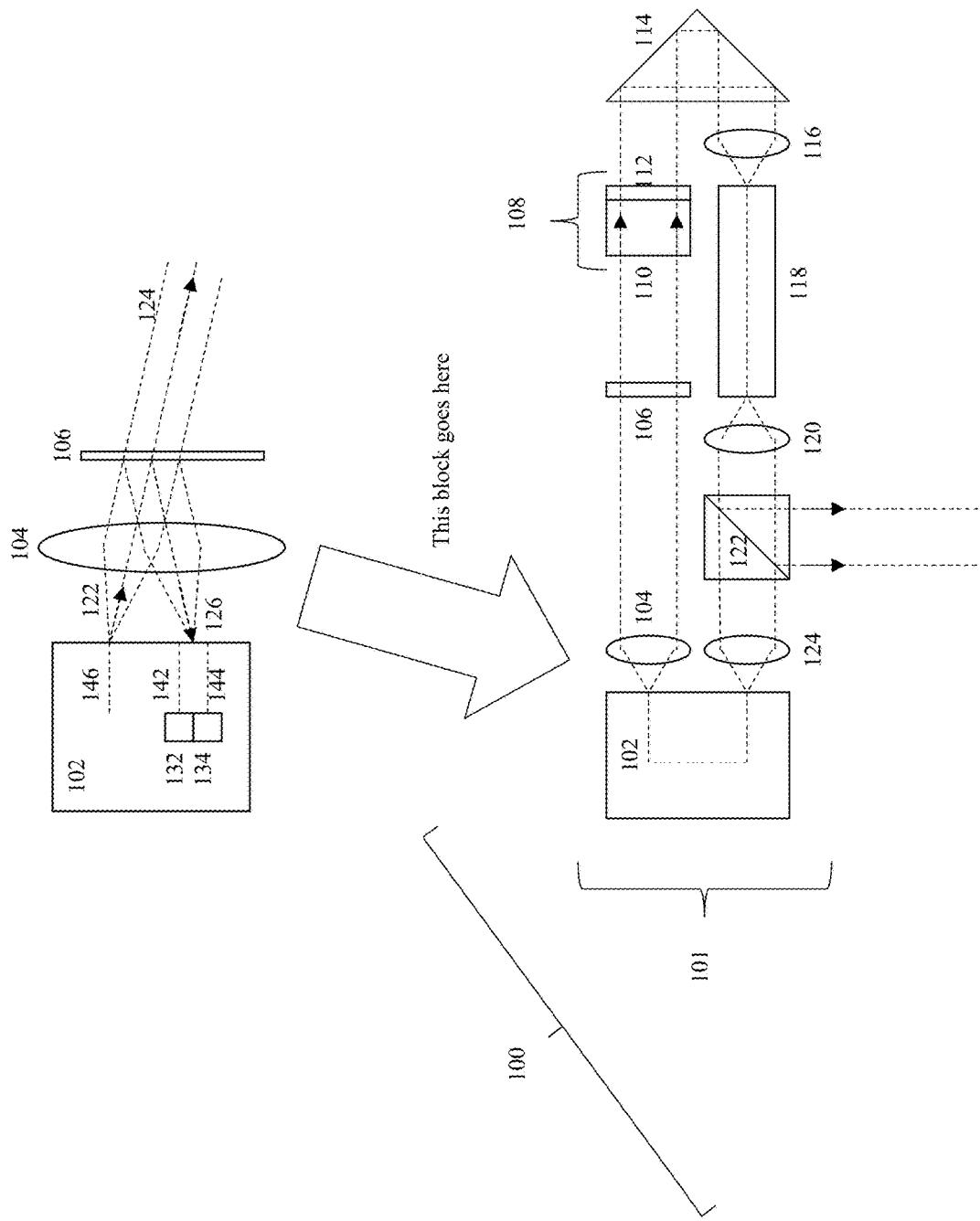
FIG. 13 shows an exemplary laser cavity including the wavelength control system according to various embodiments of the present disclosure.

FIG. 13 shows an exemplary laser cavity that may include the wavelength control system as described herein. The wavelength control system may be used to measure the detuning between the wavelength of the longitudinal mode of operation and the peak transmission wavelength of the filter 106 as described above. The detuning may be zeroed by changing temperature of filter 106 to bring the peak transmission into coincidence with the operating wavelength. Alternatively, the detuning may be zeroed by contracting or expanding the laser cavity to move the operating wavelength into coincidence with the filter peak transmission. The laser cavity may be contracted or expanded by changing the temperature of the amplifier 118 and or gain chip along with all other elements passively attached to the gain chip temperature control system. Bringing the operating wavelength into coincidence with the filter peak transmission maximizes output power and electrical wall plug efficiency. Furthermore, maintaining the coincidence maintains the longitudinal mode, thereby avoiding mode hops to other longitudinal modes during operation.

The wavelength control system may also be used for establishing and maintaining wavelength accuracy. In various embodiments the etalon transmission peaks may be precisely calibrated in wavelength. In one embodiment, the etalon transmission peaks may be calibrated using a look up table provides etalon operating temperature for specific wavelength targets. Interpolation and or extrapolation techniques may be used to determine wavelength targets that are between or outside those provided in the look up table. In this case, bringing the laser wavelength into coincidence with the calibrated filter transmission peak achieves a calibrated wavelength output of the laser.

Figure 14:
FIG. 14 displays a graph illustrating an exemplary control signal and other parameters used to evaluate detuning error according to various embodiments of the present disclosure.

FIG. 14 displays a table 1400 illustrating physical features of the control signal and other parameters used to evaluate detuning error. In the case of zero detuning error (second row of the table), the mode is aligned with filter (second column of the table). Perfectly tuned lasers having zero detuning error produce maximum transmission and minimal reflection. When the wavelength is detuned, the transmission is reduced and reflection increases. As shown in rows one and three of the table, the reflected energy with positive detuning is at a different physical location than with negative detuning. By considering the angular beam spread at the etalon, the far field reflection pattern can be understood as the reflection of those angles that do not meet the resonant condition for etalon transmission (right hand column).

Figure 15A:
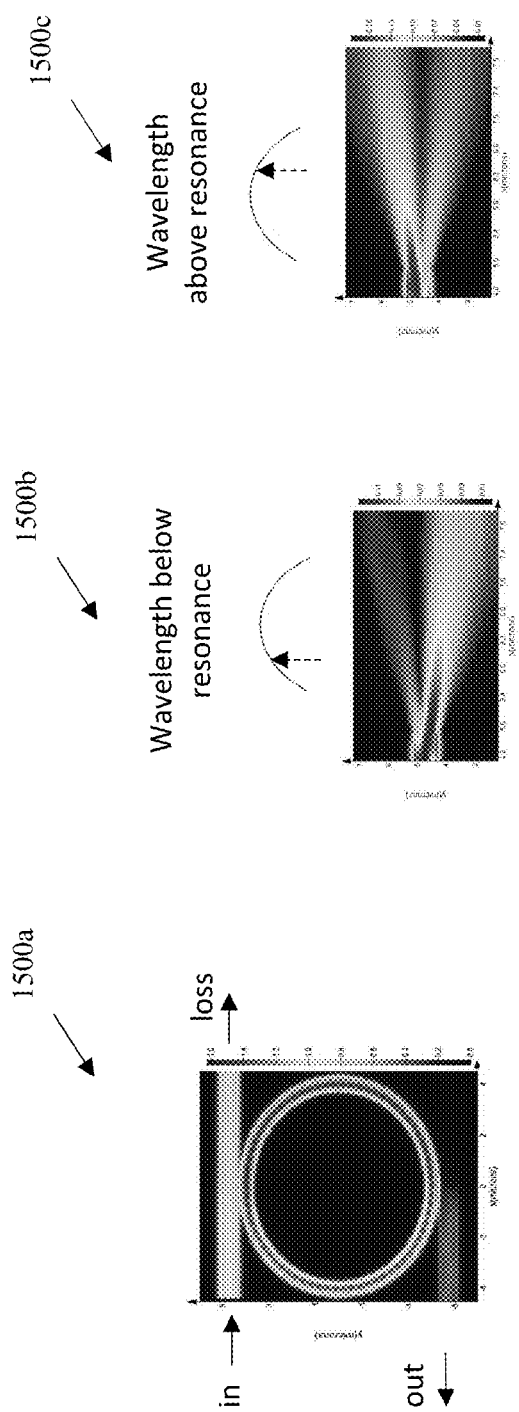
FIG. 15A shows an exemplary wavelength control system for ring resonators according to various embodiments of the present disclosure.

FIG. 15A shows another example arrangement of the wavelength control system that may be used to implement a dither free method of measuring the detuning error of ring filters. For example, the photodiode pair 360 can be embodied in integrated tuner 302. For example, as shown in first illustration 1500a, the illustration can show a finite difference time domain simulation of a ring where the wavelength of light is not at a ring resonance. When the wavelength is not at resonant, some light travels into the loss port waveguide. The momentum of the light in the loss waveguide changes across the resonance. In one embodiment, this momentum is accessed by terminating the loss waveguide to allow propagation into substrate. With the loss waveguide terminated close to ring, and the wavelength below resonance, the optical flux propagates below the loss waveguide centerline (e.g., 1500b). With the wavelength above resonance, the optical energy propagates above the loss waveguide centerline (e.g., 1500c). Collecting the light with a photodiode pair placed above and below centerline, then taking the difference in photocurrents generates the detuning error signal. In other embodiments, the loss waveguide is tapered from the width used to carry single lateral mode light to a larger width where the next higher lateral mode also propagates in the waveguide. In this embodiment, a photodiode placed at the terminus of this expanded waveguide and split to separately collect the photocurrent generated above and below centerline, is used to generate the detuning error.

FIG. 15B shows another example of the wavelength control system that may be used to implement a dither free method of measuring detuning error for a ring element. In wavelength division multiplexing add-drop applications, input waveguide 491 carries a plurality of wavelengths. One of these wavelengths, the drop wavelength, matches the resonant condition of ring 450 and is diverted to drop waveguide 492. The remaining wavelengths, those not dropped, are carried out on waveguide 493. Tap photodiodes 461 and 462 tap a small amount of fundamental mode light from the output waveguide 461 (for example 1%). This fundamental mode light is captured by placing additional waveguides in the evanescent field outside waveguide 492 to convert some of the evanescent field into propagating field. The first lateral mode also has field (evanescent or propagating) outside waveguide 492 that is also picked up by taps 461 and 462. The captured fundamental mode and first lateral mode interfere at photodiodes 461 and 462. The difference between the photodiode photocurrents is the detuning error signal. In another embodiment, the taps 461 and 462 are placed about output waveguide 493.

In some instances, a tunable laser is provided. The tunable laser can include a ring cavity that can include a free space segment and a semiconductor waveguide. The free space segment can include an etalon. The semiconductor waveguide can include a channel selector. The channel selector can be tunable. The free space segment can include an isolator. In some embodiments, the channel selector includes multiple stages. Each of the multiple stages can include a Mach Zehnder Interferometer.

In another example embodiment, a laser is provided. The laser can include a ring cavity that comprises a free space segment and a semiconductor waveguide. The free space segment can include an etalon, and the semiconductor waveguide can include an output tap. The output tap can be coupled to a power monitor, a modulator, and/or a receiver.

In another example embodiment, a multiwavelength optical system is provided. The multiwavelength optical system can include a plurality of ring cavities. Each ring cavity can include a dedicated gain medium, and the ring cavities can share a common etalon. The common etalon can be in the free space. Further, each ring cavity further can share a dedicated wavelength multiplexer or a dedicated output tap. In some instances, the ring cavities can include a common output tap.

In another example embodiment, a laser is provided. The laser can include a ring cavity that comprises a free space segment and a semiconductor waveguide. The free space segment can include an etalon. Further, the semiconductor waveguide can include at least two different optical paths. Each of the two optical paths can include an output tap. Further, the semiconductor waveguide can include an optical splitter and/or an optical multiplexer that is coupled each of the two optical paths.

In another example embodiment, a tunable laser is provided. The tunable laser can include a ring-shaped laser cavity and an infinite impulse response filter disposed inside the ring-shaped laser cavity. The tunable laser can also include a tunable channel selector disposed inside the ring-shaped laser cavity. The tunable channel selector can include multiple stages. Each of the multiple stages of the tunable channel selector can be tuned to have transmission peaks at a pre-determined wavelength. At least one of the multiple stages can include a free spectral range that is at least twice a free spectral range of a previous stage included in the multiple stages. A total roundtrip transmission through the infinite impulse response filter and the tunable channel selector can be within a threshold range of an operating point.

In some instances, the total roundtrip transmission has no side modes of the operating point. In some instances, each of the multiple stages includes a tunable Mach-Zhender interferometer.

In some instances, the tunable laser can also include a free space portion and a waveguide portion. In some instances, the waveguide portion comprises the infinite impulse response filter.

In some instances, the waveguide portion comprises an output tap. In some instances, the output tap is coupled to a power monitor, a modulator, or to a receiver. In some instances, the tunable laser can also include the free space portion comprises an isolator.

In another example embodiment, a tunable filter system is provided. The tunable filter system can include an infinite impulse response filter positioned in an incident laser beam. The infinite impulse response filter can be configured to intake the incident laser beam and split the incident laser beam to a through port and a loss port. The tunable filter can also include multiple detectors positioned in the loss port. Each of the multiple detectors can be configured to intercept the split portion of the incident laser beam. Each detector can be configured to generate a detector signal. Detector signals can be generated such that a difference between the multiple detector signals generated by the multiple detectors is an error signal that indicates a degree of detuning of the incident laser beam.

In some instances, any of a wavelength of the incident laser beam or the infinite impulse response filter is tunable to minimize a difference value between the detector signals generated by the multiple detectors.

In some instances, the multiple detectors are disposed adjacent to an output waveguide in a semiconductor wafer.

In some instances, the tunable filter system can include a lens positioned to collimate a beam from the output waveguide to generate a collimated beam. The infinite impulse response filter can include a tilt and is configured to intercept the collimated beam and generate a reflected portion of the collimated beam that is incident on the multiple detectors. In some instances, the infinite impulse response filter is an etalon in a free space.

In another example embodiment, a laser is provided. The laser can include a laser cavity and a photonic tuner. The photonic tuner can include an integrated infinite impulse response filter and a tunable channel selector.

In some instances, the photonic tuner can further comprise an input waveguide and an output waveguide. The input waveguide and the output waveguide can include spot size converters for coupling light between the input waveguides and output waveguide.

In some instances, the laser can also include a tap photodiode configured to tap a portion of a light source from the input waveguide to a photodiode.

In some instances, the laser can include an unbalanced chain of tunable Mach-Zhender interferometers (MZI).

This specification describes in detail various embodiments and implementations of the present invention, and the present invention is open to additional embodiments and implementations, further modifications, and alternative and/or complementary constructions. There is no intention in this patent to limit the invention to the particular embodiments and implementations disclosed; on the contrary, this patent is intended to cover all modifications, equivalents and alternative embodiments and implementations that fall within the scope of the claims.

As used in this specification, a set means any group of one, two or more items. Analogously, a subset means, with respect to a set of N items, any group of such items consisting of N−1 or less of the respective N items.

In general, unless otherwise stated or required by the context, when used in this patent in connection with a method or process, data processing system, or logic module, the words "adapted" and "configured" are intended to describe that the respective method, data processing system or logic module is capable of performing the respective functions by being appropriately adapted or configured (e.g., via programming, via the addition of relevant components or interfaces, etc.), but are not intended to suggest that the respective method, data processing system or logic module is not capable of performing other functions. For example, unless otherwise expressly stated, a logic module that is described as being adapted to process a specific class of information will not be construed to be exclusively adapted to process only that specific class of information, but may in fact be able to process other classes of information and to perform additional functions (e.g., receiving, transmitting, converting, or otherwise processing or manipulating information).

As used in this specification, the terms "include," "including," "for example," "exemplary," "e.g.," and variations thereof, are not intended to be terms of limitation, but rather are intended to be followed by the words "without limitation" or by words with a similar meaning. Definitions in this specification, and all headers, titles and subtitles, are intended to be descriptive and illustrative with the goal of facilitating comprehension but are not intended to be limiting with respect to the scope of the inventions as recited in the claims. Each such definition is intended to also capture additional equivalent items, technologies or terms that would be known or would become known to a person of average skill in this art as equivalent or otherwise interchangeable with the respective item, technology or term so defined. Unless otherwise required by the context, the verb "may" or "could" indicates a possibility that the respective action, step or implementation may or could be achieved, but is not intended to establish a requirement that such action, step or implementation must occur, or that the respective action, step or implementation must be achieved in the exact manner described.

What is claimed is:

1. A tunable filter system comprising:
   an infinite impulse response filter positioned in an incident laser beam, the infinite impulse response filter configured to intake the incident laser beam and split the incident laser beam into a transmitted beam portion transmitted along a transmission beam axis and a reflected beam portion reflected along a reflecting beam axis; and
   multiple detectors positioned symmetrically along a centerline of the reflecting beam axis, wherein each of the multiple detectors are configured to measure a power above and a power below the centerline of the reflecting beam axis, wherein each detector is configured to generate a detector signal, and wherein detector signals are generated such that a difference between the multiple detector signals generated by the multiple detectors as determined based on the power above and the power below the centerline of the reflecting beam axis is an error signal that indicates a degree of detuning of the incident laser beam.

2. The tunable filter system of claim 1, wherein any of a wavelength of the incident laser beam or the infinite impulse response filter is tunable to minimize a difference value between the detector signals generated by the multiple detectors.

3. The tunable filter system of claim 1, wherein the multiple detectors are disposed adjacent to an output waveguide in a semiconductor wafer.

4. The tunable filter system of claim 3, further comprising:
   a lens positioned to collimate a beam from the output waveguide to generate a collimated beam, wherein the infinite impulse response filter includes a tilt and is configured to intercept the collimated beam and generate a reflected portion of the collimated beam that is incident on the multiple detectors.

5. The tunable filter system of claim 4, wherein the infinite impulse response filter is an etalon in a free space.

* * * * *